United States Patent [19]

Steffes

[11] 4,404,803
[45] Sep. 20, 1983

[54] BRAKE UNIT WITH A HYDRAULIC BOOSTING DEVICE

[75] Inventor: Helmut Steffes, Eschborn, Fed. Rep. of Germany

[73] Assignee: ITT Industries, Inc., New York, N.Y.

[21] Appl. No.: 244,950

[22] Filed: Mar. 18, 1981

[30] Foreign Application Priority Data

Apr. 30, 1980 [DE] Fed. Rep. of Germany ....... 3016683

[51] Int. Cl.³ .............................................. B60T 13/00
[52] U.S. Cl. ..................... 60/547.1; 60/563; 60/565; 60/591; 303/2; 303/13
[58] Field of Search ...................... 60/591, 547 R, 560, 60/574, 563, 564, 565, 548; 91/33; 188/347, 348; 303/2, 13, 14

[56] References Cited

U.S. PATENT DOCUMENTS

| | | | |
|---|---|---|---|
| 2,799,140 | 7/1957 | Osborne | 60/548 |
| 3,712,057 | 1/1973 | Aiki | 60/547 |
| 3,727,986 | 4/1973 | Koirunen | 60/548 |
| 3,787,147 | 1/1974 | McClocklin | 60/547 |
| 4,050,251 | 9/1977 | Carre | 60/574 |
| 4,126,996 | 11/1978 | Leiber | 60/547 R |
| 4,208,872 | 6/1980 | Shimizu | 60/547 R |
| 4,225,022 | 9/1980 | Belart | 188/348 |

FOREIGN PATENT DOCUMENTS

| | | | |
|---|---|---|---|
| 622617 | 5/1949 | United Kingdom | 60/548 |
| 676764 | 7/1979 | U.S.S.R. | 60/547 R |

Primary Examiner—Abraham Hershkovitz
Attorney, Agent, or Firm—John T. O'Halloran; Alfred C. Hill

[57] ABSTRACT

A brake unit comprising a hydraulic booster unit connected to hydraulic auxiliary energy and controllable by a brake pedal via a control piston drives a master brake cylinder unit to supply brake pressure to wheel brake cylinders through at least one hydraulic line connected to an output of the master brake cylinder unit. A bypass line connected to the work chamber of the booster unit supplies a preliminary feed of the auxiliary energy to the wheel brake cylinders to overcome the brake clearance. A two way, two position changeover valve is connected to the hydraulic line, the bypass line and the wheel brake cylinders to connect during a braking operation either the bypass line or the hydraulic line to the wheel brake cylinders dependent on the pressure in the two lines. This brake unit requires only a few hydraulic connections external of the unit, has a single construction, has small dimensions, has exact operation and has quick response.

14 Claims, 1 Drawing Figure

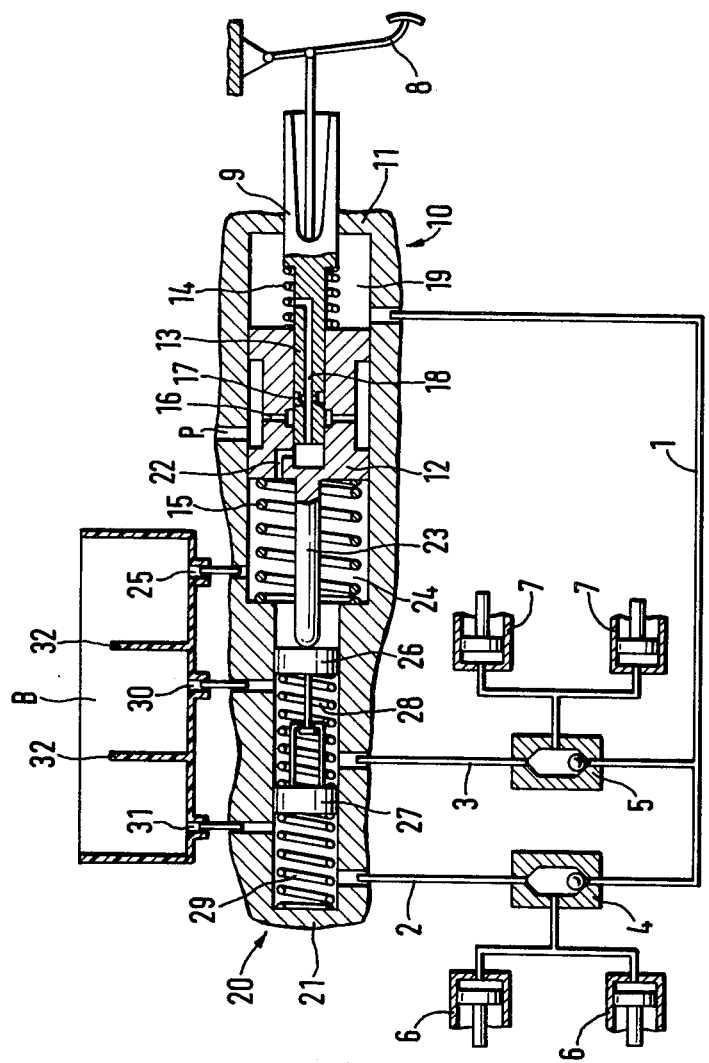

BRAKE UNIT WITH A HYDRAULIC BOOSTING DEVICE

BACKGROUND OF THE INVENTION

The present invention relates to a brake unit incorporating a hydraulic boosting device to generate a brake pressure in a vehicular brake system having a booster unit connected to hydraulic auxiliary energy, the booster unit being controllable by a brake pedal via a control piston for driving a master brake cylinder unit for the purpose of supply of brake pressure to the wheel brake cylinders through at least one hydraulic line connected to an output of the master brake cylinder unit, with a bypass line being provided for the booster piston, which line is actuatable by the hydraulic auxiliary energy and constructed to preliminarily feed sufficient brake pressure to the wheel brake cylinders to overcome the brake clearance. The bypass line is connected to the drive pressure or working chamber for the booster piston and includes a valve device which will close the hydraulic bypass line after the preliminary feed of brake pressure to the wheel brake cylinders.

In a known brake unit of the above-mentioned type, for example, as described in my copending U.S. application Ser. No. 144,072, filed Apr. 28, 1980, now U.S. Pat. No. 4,341,076, issued July 27, 1982 the bypass line of the booster piston leading away from the drive or working side of the booster unit communicates with a shut-off transmission pressure chamber which is formed between the booster piston and a working piston disposed downstream from the booster piston, the working piston on its part acting on the master brake cylinder piston via a push rod. As is conventional practice, the master cylinder piston displaces pressure fluid during a braking action via at least one hydraulic line into the brake cylinder of the individual wheels of an automotive vehicle. During the preliminary feed of brake pressure to the wheel brake cylinders (to overcome the brake clearance), when the bypass line is open, the booster piston is automatically held substantially in its desired initial position and the working piston actuates the push rod in response to the bypassed brake pressure. During subsequent braking action, after the bypass line is closed, the booster piston is moved in the direction of the master brake cylinder corresponding to the actuating force applied by an operator through the brake pedal and assisted by the auxiliary energy and actuates the working piston as well as the master cylinder piston push rod via the shut-off transmission pressure chamber. The transmission pressure chamber of this prior art requires the formation and provision of an interposed working piston and an additional push rod. Moreover, the booster piston must incorporate a radial breather bore which makes its construction complicated and is detrimental to its overall length.

SUMMARY OF THE INVENTION

It is an object of the present invention to provide an improved brake unit of the type referred to hereinabove, in which, following a short initial movement of the brake pedal, the brake pedal, the control piston of the booster and the booster piston will basically remain in their positions until all idle paths are completely compensated for by employing simple structural means.

A feature of the present invention is the provision of a brake unit to generate a braking pressure in a vehicle brake system comprising a hydraulic booster unit connected to an auxiliary hydraulic boosting fluid source, the booster unit being controlled by a brake pedal via a control piston for driving a master brake cylinder unit to supply the brake pressure to wheel brake cylinders through at least one hydraulic line connected to an outlet of the master cylinder unit; a bypass line connected to a boosting chamber of the booster unit subjected to auxiliary boosting fluid from the source upon actuation of the brake pedal to provide a preliminary feed of the boosting fluid to the wheel brake cylinders to overcome brake clearance; and a changeover valve connected to the wheel brake cylinders, the hydraulic line and the bypass line to connect the bypass line to and disconnect the hydraulic line from the wheel brake cylinders during the preliminary feed and to connect the hydraulic line to and disconnect the bypass line from the wheel brake cylinders after the brake clearance is overcome.

In the brake unit of the present invention, following a short movement of the brake pedal, the hydraulic auxiliary energy from a hydraulic fluid source is in the beginning fed into the bypass line of the booster piston and supplied directly to the wheel brake cylinders via the changeover valve, which is in a first position such that the bypass line is open and the hydraulic line of the master cylinder is closed, until the brake surfaces in the entire brake system are in abutment and a counterpressure is built up. Only in this event will the changeover valve switch over to its second position to close the bypass line and open the hydraulic line. The pedal travel required to achieve this effect is independent of the idle paths which are at that time existing in the brake system. The booster piston will remain almost immovable until the changeover valve switches over to its second position. Accordingly, the total stroke of the booster piston can be dimensioned small. In contrast to the above-mentioned prior art brake unit, there is no need to provide a shut-off transmission pressure chamber with the working piston and the additional push rod between the booster piston and the master cylinder. The brake unit of the present invention is accordingly able to have smaller dimensions. In addition to this, a radial compensating bore communicating with a supply reservoir is disposed between the end of the booster piston and the adjacent end of the master cylinder piston, so that the radial compensating bore of the booster piston in the above-mentioned prior art may be dispensed with. Accordingly, the structure of the booster is simplified and its overall length is decreased. The basic construction of the brake unit allows a non-complicated and low-cost manufacture and a variable construction according to mechanical assembly techniques.

The entire assembly may, for instance, represent the simple basic construction of a brake unit without a bypass line and a changeover valve, while a brake unit of improved construction is characterized by having these supplementary devices. Another advantage results from the quantity of the preliminary feed of the brake pressure, which is necessary for overcoming the brake clearance, being independent of the piston travels. The wheel brake cylinders will be fed preliminarily in a simple manner until the final feed level is attained, and the wheel brake cylinders are afterwards connected to the hydraulic line. In contrast to this, in the above-mentioned prior art brake unit, the pressure fluid quantity necessary for a preliminary feed is at a constant value which has to be taken into consideration when dimensioning the working piston. One single fluid is used as a hydraulic medium in the brake unit according to the present invention, this fluid being simultaneously brake fluid and booster fluid. The entire device is able to be of a correspondingly simple construction, for instance, incorporating common supply reservoirs for brake and booster circuits as well as including a smaller number of sealing points in comparison to the above-mentioned prior art brake unit which employs two hydraulic mediums and, consequently, requires isolation of the mediums and provision of additional seals.

It is known from, for instance, German Patent 602,118 to subject the wheel brake cylinder piston directly to hydraulic auxiliary energy for overcoming the idle paths in brakes. However, the known device is not constructed as a brake unit assisted by hydraulic brake force and uses an on-off valve which is switchable dependent upon the brake pedal travel to switch the auxiliary energy on and off. The on-off valve inherently does not allow smooth switching actions and, as a result, gives the operator only an insufficient sense of braking. When applied, the brake pedal will be securely held in an intermediate position by a locking mechanism for as long as the auxiliary energy is required in the first operating phase of a braking action. The sense of braking is further impaired thereby. The entire system is scarcely suitable for practical operation, since it permits an uncontrolled supply of the auxiliary energy to the wheel brake cylinders in a constant intermediate position of the brake pedal having an uncontrolled panic stop as a result.

An advantageous embodiment of the present invention employs a two-way, two position changeover valve, which is switchable in response to pressure. The switching pressure, at which the changeover valve switches over, may be selected according to the prevailing conditions.

Expediently, the switching pressure of the changeover valve has a limiting value which corresponds approximately to the lower limit of the effective brake pressure. Though the brake surfaces of the brake system bear against each other in this arrangement, there are no strong brake forces occurring yet.

For an automotive vehicle equipped with an automatic gearbox, the limiting value should correspond to a brake pressure just sufficient to produce a brake torque which is able to overcome the drive torque of the automotive vehicle when idling. The automotive vehicle can in this way be maintained at a standstill, for instance, at a traffic light, by slightly tapping the brake pedal.

A particularly advantageous embodiment of the present invention is characterized in that the changeover valve automatically connects that line, e.g. the bypass line or the hydraulic line, to the wheel brake cylinder, in which the higher pressure is prevailing. For this purpose, the changeover valve may be of a very simple construction, that is to say, without employing additional devices (pressure-measuring and switching arrangements), which are usually required for a switching action. The automatically switching changeover valve is extremely reliable in service. When the brake pedal is applied, a specific pressure from zero to a certain magnitude will be generated. The bypass line is acted upon by auxiliary energy and subjected to a small amount of dynamic pressure, whereby the changeover valve connects the bypass line to the wheel brake cylinder. After the brake clearance is overcome, a counterpressure will become effective causing a continuous increase of the pressure in the hydraulic line when the brake is applied further, which pressure in the event of exceeding of the small amount of dynamic pressure in the bypass line brings about an automatic switching-over of the changeover valve to connect the hydraulic line of the master cylinder unit to the wheel brake cylinder to brake the automotive vehicle. When the brake is released, the changeover valve remains in the braking position and the fluid flows back from the wheel brake cylinders to the master brake cylinder and—if necessary—further into a supply reservoir which is in communication with the master cylinder in a known manner.

Only a few lines leading to the individual wheel brake cylinders of a brake system have to be provided in an automotive vehicle if the changeover valve is not inserted in the vicinity of the wheel brake cylinder, but rather in the area of the master brake cylinder unit.

A particularly compact construction is the result when the changeover valve is structurally integrated in a master cylinder booster unit.

In particular, the number of changeover valves provided corresponds to the number of hydraulic lines present in the brake system.

BRIEF DESCRIPTION OF THE DRAWING

The above-mentioned and other objects and features of the present invention and the manner of obtaining them will become more apparent by reference to the following description taken in conjunction with the drawing, the single FIGURE of which is a schematic illustration of a brake unit in accordance with the principles of the present invention.

DESCRIPTION OF THE PREFERRED EMBODIMENT

Referring to the Figure, the brake unit includes a booster unit 10 connected in a conventional manner to a master brake cylinder unit 20.

In a housing 11, booster unit 10 includes in series, from the right-hand to the left-hand side when viewing the drawing, a control piston 9 communicating with a brake pedal 8 and incorporating a control slider 13, a booster piston 12 receiving control slider 13 therein and a push rod 23 which is secured to booster piston 12 for actuation of the master cylinder piston connected downstream therefrom. A first restoring spring 14 which encompasses control slider 13 of control piston 9 bears against a collar of control piston 9 and against the adjacent end face of booster piston 12, while a second restoring spring 15, which is constructed as a compression spring, is biassed between the end of booster piston 12 remote from spring 14 and the adjacent end of booster housing 11.

Booster piston 12 includes in a known manner a radial inlet 16 in communication with an outer circumferential chamber which is in communication with a hydraulic auxiliary energy or boosting fluid port P. In addition, booster piston 12 includes a compensating bore 22 extending to the end surface thereof adjacent second restoring spring 15, which bore cooperates with control slider 13 of control piston 9 in a known manner. When control slider 13 is in the position illustrated, brake pedal 8 is not actuated, compensating bore 22 is connected via the central through-bore 18 of control slider 13 to the drive pressure or work chamber 19 of the booster unit, which houses the first restoring spring 14.

In this arrangement, the control radial inlet 17 of control slider 13 is not connected to radial inlet 16 of booster piston 12, and hydraulic auxiliary energy port P is closed as a consequence.

When brake pedal 8 is actuated, control piston 9 will be displaced together with control slider 13 to the left-hand position when viewing the drawing. As a result, control slider 13 will close compensating bore 22 and open hydraulic auxiliary energy port P. Port P is then, via radial inlets 16 and 17, in communication with drive pressure or working or boosting chamber 19. Chamber 19 has an outlet communicating with a bypass line 1 of booster piston 12, the operation of which will be described hereinbelow. The cylindrical chamber of booster unit 10 containing second restoring spring 15 has a radial compensating port which is connected to a supply reservoir B.

Master brake cylinder unit 20 which is connected downstream from booster unit 10 is a tandem master brake cylinder in the embodiment illustrated and accommodates in a housing 21 a first master cylinder piston 26 and a second master cylinder piston 27 for actuation of two brake circuits. Both master cylinder pistons 26 and 27 are biassed towards booster unit 10 by corresponding compression springs, i.e. a third restoring spring 28 and a fourth restoring spring 29, respectively. When the device is assembled, first master cylinder piston 26 is urged as usual against push rod 23 of booster piston 12, which push rod is received in a central seat of first master cylinder piston 26. Thus, when brake pedal 8 is not actuated, all pistons of the master cylinder and of the booster are urged into their (according to the drawing right-hand) initial position on account of the construction of restoring springs 14, 15, 28 and 29. In this position, first master cylinder piston 26 and second master cylinder piston 27 open the breather bores 30 and 31, respectively, which connect the working chambers of the master cylinders communicating with hydraulic lines 2 and 3 for the wheel brake cylinders 6 and 7, respectively, to supply reservoir B. Supply reservoir B is constructed both as a compensating reservoir for booster unit 10 and has inside partition walls 32 so that upon failure of one hydraulic brake circuit the other one remains in operation. Supply reservoir B is connected to hydraulic auxiliary energy port P via a non-illustrated feed-pump system. Hydraulic lines 2 and 3 communicating with the working chambers of master cylinder unit 20 contain changeover valves 4 and 5, respectively, each having one further port for hydraulic bypass line 1 which is connected to drive pressure chamber 19 of booster unit 10. Changeover valve 4 is additionally in hydraulic communication with a pair of wheel brake cylinders 6 and changeover valve 5 is additionally in hydraulic communication with a pair of wheel brake cylinders 7. Changeover valves 4 and 5 are constructed as two-way, two-position valves and are switchable in response to pressure, that is to say, each changeover valve will connect that line—either hydraulic bypass line 1 or hydraulic line 2 or 3—to the user port, in which the higher pressure is prevailing.

The mode of operation of the brake unit will now be described. When the brake pedal 8 is pushed to the left-hand side, when viewed in the drawing, sufficiently so that radial inlet 17 of control slider 13 is connected to radial inlet 16 of booster piston 12 and compensating bore 22 is closed, a connection will be established between hydraulic auxiliary energy port P via drive pressure chamber 19 and bypass line 1, and a low dynamic pressure will develop in this line switching changeover valves 4 and 5 in such a way as to connect hydraulic bypass line 1 to wheel brake cylinders 6 and 7 and to close hydraulic lines 2 and 3. The auxiliary energy in bypass line 1 causes displacement of the pistons in the wheel brake cylinders until all idle paths existing in the brake system are overcome and the brake linings are applied to the discs or the drums of the brake and a counterpressure develops. In this phase of operation, control piston 9 and booster piston 12 are substantially maintained in their initial position. The development of counterpressure in the wheel brake cylinder and a still further depression of brake pedal 8 causes a displacement of booster piston 12 to the left in the drawing, and push rod 23 connected to booster piston 12 actuates first master cylinder piston 26 and, hence, simultaneously second master cylinder piston 27, which results in breather bores 30 and 31 being closed and the pressure in hydraulic lines 2 and 3 being increased. When the pressure prevailing in hydraulic lines 2 and 3 becomes higher than the one prevailing in bypass line 1, changeover valves 4 and 5 will connect master cylinder 20 to the wheel brake cylinders and close bypass line 1. The brake takes effect in this phase of operation. Since bypass line 1 is closed now, the hydraulic auxiliary energy flowing into drive pressure chamber 19 is made use of for actuating booster piston 12. When brake pedal 8 is released, restoring springs 14, 15, 28 and 29 will bring about a resetting of brake pedal 8 to the right in the drawing, while all pistons are simultaneously reset into their initial position, in which the hydraulic auxiliary energy port is shut off and central through-bore 18 of control slider 13 establishes a connection from drive pressure chamber 19 via compensating bore 22 to compensating chamber 24 and then to supply reservoir B via the compensating port 25. When the brake is released, the position of changeover valves 4 and 5 will be maintained as shown, so that the hydraulic fluid returns from the wheel brake cylinders into master cylinder unit 20, and is—if necessary—fed to supply reservoir B via open breather bores 30 and 31.

A so-called "monofluid" is used as a hydraulic fluid which simultaneously is the brake fluid and the booster fluid. While I have described above the principles of my invention in connection with specific apparatus, it is to be clearly understood that this description is made only by way of example and not as a limitation to the scope of my invention as set forth in the objects thereof and in the accompanying claims.

I claim:
1. A brake unit to generate a braking pressure in a vehicular brake system comprising:
   a hydraulic booster unit connected to an auxiliary hydraulic boosting fluid source, said booster unit being controllable by a brake pedal via a control piston for driving a master brake cylinder unit to supply said braking pressure to wheel brake cylinders through at least one hydraulic line connected to an outlet of said master cylinder unit;
   a bypass line connected to a boosting chamber of said booster unit subjected to auxiliary boosting fluid from said source upon actuation of said brake pedal to provide a preliminary feed of said boosting fluid to said wheel brake cylinders to overcome brake clearance; and
   a changeover valve directly connected to said wheel brake cylinders, said hydraulic line and said bypass line responsive to said braking pressure and the pressure of said boosting fluid to connect said bypass line to and disconnect said hydraulic line from said wheel brake cylinders during said preliminary feed and to connect said hydraulic line to and disconnect said bypass line from said wheel brake cylinders after said brake clearance is overcome.

2. A brake unit according to claim 1, wherein
said changeover valve is a pressure responsive switching, two way, two position changeover valve.

3. A brake unit according to claim 2, wherein
said pressure responsive changeover valve has a switching pressure approximately equal to a lower limit of an effective brake pressure.

4. A brake unit according to claim 2, wherein
said pressure responsive changeover valve has a switching pressure equal to a brake pressure which is just sufficient to produce a brake torque overcoming a driving torque of an automotive vehicle when idling.

5. A brake unit according to claims 1, 2, 3 or 4, wherein
said changeover valve automatically connects that one of said hydraulic line and said bypass line to said wheel brake cylinders having the highest pressure therein.

6. A brake unit according to claim 5, wherein
said changeover valve is disposed in an area adjacent said master brake cylinder unit.

7. A brake unit according to claim 6, wherein
said changeover valve is capable of being structurally integrated with said master brake cylinder unit and said booster unit.

8. A brake unit according to claim 7, wherein
said master brake cylinder unit has a plurality of said hydraulic lines connected thereto and a plurality of said changeover valves equal in number to said plurality of said hydraulic lines connected in common to said bypass line are provided.

9. A brake unit according to claim 5, wherein
said master brake cylinder unit has a plurality of said hydraulic lines connected thereto and a plurality of said changeover valves equal in number to said plurality of said hydraulic lines connected in common to said bypass line are provided.

10. A brake unit according to claims 1 or 2, wherein
said changeover valve is disposed in an area adjacent said master brake cylinder unit.

11. A brake unit according to claim 10, wherein
said changeover valve is capable of being structurally integrated with said master brake cylinder unit and said booster unit.

12. A brake unit according to claim 11, wherein
said master brake cylinder unit has a plurality of said hydraulic lines connected thereto and a plurality of said changeover valves equal in number to said plurality of said hydraulic lines connected in common to said bypass line are provided.

13. A brake unit according to claim 10, wherein
said master brake cylinder unit has a plurality of said hydraulic lines connected thereto and a plurality of said changeover valves equal in number to said plurality of said hydraulic lines connected in common to said bypass line are provided.

14. A brake unit according to claims 1 or 2, wherein
said master brake cylinder unit has a plurality of said hydraulic lines connected thereto and a plurality of said changeover valves equal in number to said plurality of said hydraulic lines connected in common to said bypass line are provided.

* * * * *